United States Patent
Mathiske et al.

(10) Patent No.: US 6,738,926 B2
(45) Date of Patent: May 18, 2004

(54) METHOD AND APPARATUS FOR RECOVERING A MULTI-THREADED PROCESS FROM A CHECKPOINT

(75) Inventors: Bernd J. W. Mathiske, Cupertino, CA (US); Glenn C. Skinner, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 536 days.

(21) Appl. No.: 09/882,941

(22) Filed: Jun. 15, 2001

(65) Prior Publication Data

US 2002/0194525 A1 Dec. 19, 2002

(51) Int. Cl.$^7$ .................................................. G06F 11/00
(52) U.S. Cl. ...................................................... 714/15
(58) Field of Search ............................. 714/15, 20, 21, 714/38

(56) References Cited

U.S. PATENT DOCUMENTS

| | | | | |
|---|---|---|---|---|
| 6,021,272 A | * | 2/2000 | Cahill et al. | 717/147 |
| 6,185,702 B1 | * | 2/2001 | Shirakihara et al. | 714/38 |
| 6,332,200 B1 | * | 12/2001 | Meth et al. | 714/16 |
| 6,539,339 B1 | * | 3/2003 | Berry et al. | 702/186 |
| 6,594,774 B1 | * | 7/2003 | Chapman et al. | 714/2 |
| 2001/0054057 A1 | * | 12/2001 | Long et al. | 709/108 |
| 2002/0194525 A1 | * | 12/2002 | Mathiske et al. | 714/5 |
| 2003/0187911 A1 | * | 10/2003 | Abd-El-Malek et al. | 709/108 |

OTHER PUBLICATIONS

IBM Technical Disclosure Bulletin "Subsystem Attachment Package" Feb. 1983, vol. 25, issue 9, pp4559–4565.*
Youhoul, Zhang "A Checkpoint–based High Availability Run–Time system for Windows NT clusters" date unknown.*
Karablieh, Feras "Heterogeneous Checkpointing for Multi-threaded Applications" IEEE 2002 pp 140–149.*
Tullman, Patrick "User–Level Checkpointing through Exportable Kernal State" IEEE 1996.*

* cited by examiner

Primary Examiner—Robert Beausoliel
Assistant Examiner—Bryce P. Bonzo
(74) Attorney, Agent, or Firm—Park, Vaughan & Fleming LLP

(57) ABSTRACT

One embodiment of the present invention provides a system for recovering a process that is multi-threaded from checkpoint information that was previously stored for the process. During a recovery operation, the system first retrieves the checkpoint information for the process. Next, the system extracts an identifier for a program being run by the process as well as parameters of the program from the checkpoint information. The system also extracts thread identifiers for threads associated with the process from the checkpoint information. Next, the system modifies the program so that executing the program will cause threads associated with the process to be restored. The system then creates a replacement process to replace the process, and causes the replacement process to execute the modified program so that the threads are reconstituted within the replacement process.

27 Claims, 3 Drawing Sheets

METHOD AND APPARATUS FOR RECOVERING A MULTI-THREADED PROCESS FROM A CHECKPOINT

BACKGROUND

1. Field of the Invention

The present invention relates to operating systems for computers. More specifically, the present invention relates to a method and an apparatus for recovering a multi-threaded process from a checkpoint.

2. Related Art

Computer systems often provide a checkpointing mechanism for fault-tolerance purposes. A checkpointing mechanism operates by periodically performing a checkpointing operation that stores a snapshot of the state of a running computer system to a checkpoint repository, such as a file. If the computer system subsequently fails, the computer system can rollback to a previous checkpoint by using information from the checkpoint file to recreate the state of the computer system at the time of the checkpoint. This allows the computer system to resume execution from the checkpoint, without having to redo the computational operations performed prior to the checkpoint.

The checkpoint recovery process is complicated for multi-threaded processes that support multiple threads of execution, which share a single address space. Such multi-threaded processes are growing increasingly more common.

Note that native threads within an operating system are often referred to as "light-weight processes" (LWPs). LWPs are typically created and scheduled by the operating system, and the operating system typically provides only a minimal application program interface (API) to manipulate LWPs from outside the operating system kernel. The abstraction of an LWP through an API is often referred to as a "thread". Within this specification, we refer to both an "LWP" and an abstraction of the LWP through an API as a "thread".

In order to checkpoint a process with multiple threads, it is necessary to record thread-specific information from inside the kernel of an operating system, so that the threads can be accurately recreated during a checkpoint recovery operation. For example, thread identifiers must be accurately recreated during a recovery operation because some aspects of program execution may depend upon thread identifiers. Hence, if threads are not recreated with the same identifiers, the restored program may behave differently than the original program.

Unfortunately, retrieving thread-specific information from the kernel and using this information to restore threads within the kernel may require complicated additions and/or modifications to the kernel, and such kernel additions are typically very hard to debug and maintain.

Alternatively, thread-specific information can be manipulated through modifications and/or additions to the thread library that provides user-level linkages to thread-specific information in the kernel. However, modifying the thread library can potentially cause unexpected side-effects, and can additionally create maintenance problems.

Another option is to modify an application program to recreate the necessary threads. However, this involves a great deal of additional work for the application programmer.

What is needed is a method and an apparatus for restoring a process with multiple threads without the above-described complications.

SUMMARY

One embodiment of the present invention provides a system for recovering a process that is multi-threaded from checkpoint information that was previously stored for the process. During a recovery operation, the system first retrieves the checkpoint information for the process. Next, the system extracts an identifier for a program being run by the process as well as parameters of the program from the checkpoint information. The system also extracts thread identifiers for threads associated with the process from the checkpoint information. Next, the system modifies the program so that executing the program will cause threads associated with the process to be restored. The system then creates a replacement process to replace the process, and causes the replacement process to execute the modified program so that the threads are reconstituted within the replacement process.

In one embodiment of the present invention, the modified program causes the threads associated with the process to be restored. This is accomplished by creating threads with identifiers matching the thread identifiers extracted from the checkpoint information, and then restoring registers for the threads from the checkpoint information. This modified program also restores an address space for the process, and activates the threads so that they commence execution.

In a variation on this embodiment, restoring the address space for the process involves overwriting the modified program with an unmodified version of the program. This unmodified version of the program does not contain the modifications that cause the threads to be restored.

In one embodiment of the present invention, creating the threads involves creating threads for successive identifiers until a thread with a highest identifier in the extracted identifiers is created. The system then disposes of threads with identifiers that do not match the extracted identifiers.

In one embodiment of the present invention, other processes continue executing while the process is being recovered.

In one embodiment of the present invention, obtaining the checkpoint information for the process involves retrieving the checkpoint information from a file.

In one embodiment of the present invention, the process is recovered by code executing in user space, outside of a kernel of an operating system, so that no modifications to the kernel are required to facilitate the recovery process.

In one embodiment of the present invention, the modified program makes system calls to create the threads.

In one embodiment of the present invention, modifying the program involves pre-loading and linking a dynamic library containing code that causes threads associated with the process to be restored.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Recovery of a Process

Figure 1:
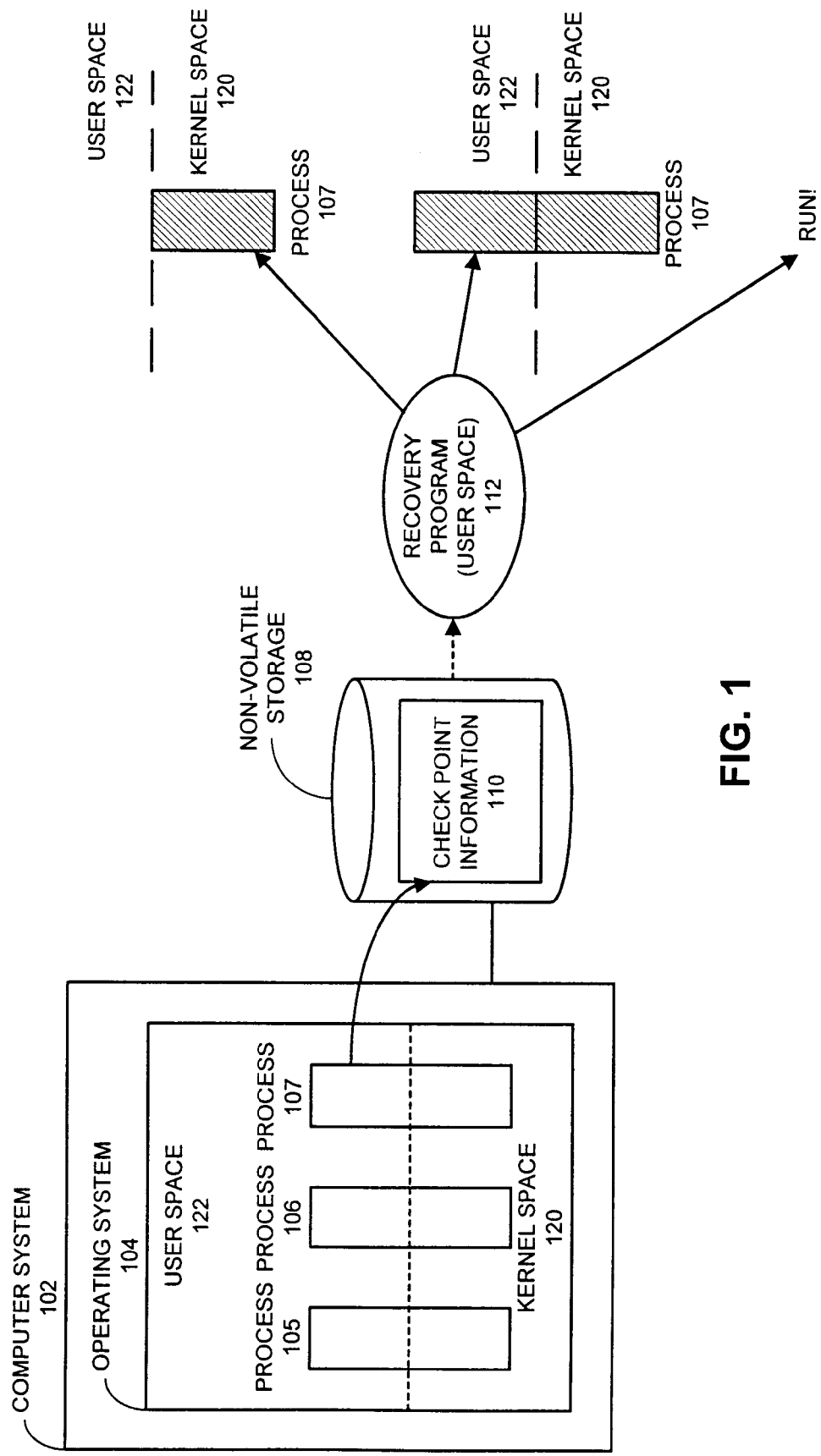
FIG. 1 illustrates the recovery of a process from a checkpoint in accordance with an embodiment of the present invention.

FIG. 1 illustrates the recovery of a process from a checkpoint in accordance with an embodiment of the present invention. As is illustrated in FIG. 1, a computer system 102 has an operating system 104 that includes a number of processes 105–107. Note that computer system 102 can generally include any type of computer system, including, but not limited to, a computer system based on a microprocessor, a mainframe computer, a digital signal processor, a portable computing device, a personal organizer, a device controller, and a computational engine within an appliance. Furthermore, computer system 102 can include a uniprocessor system, or alternatively, a multiprocessor system with multiple central processing units (CPUs). Note that each of processes 105–107 stores state information in user space 122 as well as state information in kernel space 120.

The checkpointing operation of the present invention can checkpoint all of the processes 105–107, or alternatively only a single process 107. The resulting checkpoint information 110 is stored in non-volatile storage device 108. Note that non-volatile storage device 108 can include any type of non-volatile storage device that can be coupled to a computer system. This includes, but is not limited to, magnetic, optical, and magneto-optical storage devices, as well as storage devices based on flash memory and/or battery-backed up memory. Checkpoint information 110 includes state information from user space 122 and kernel space 120, as well as the contents of registers for one or more threads executing under process 107.

During a subsequent recovery operation, recovery program 112 executes in user space 122 and causes a number of operations to take place. As is illustrated in the top portion of FIG. 1, recovery program 112 restores state information for process 107 inside of kernel space 120. Recovery program 112 also restores state information within user space 122 for process 107. Finally, recovery program 112 causes process 107 to run by starting all threads (LWPs) operating under process 107.

Code Module

Figure 2:
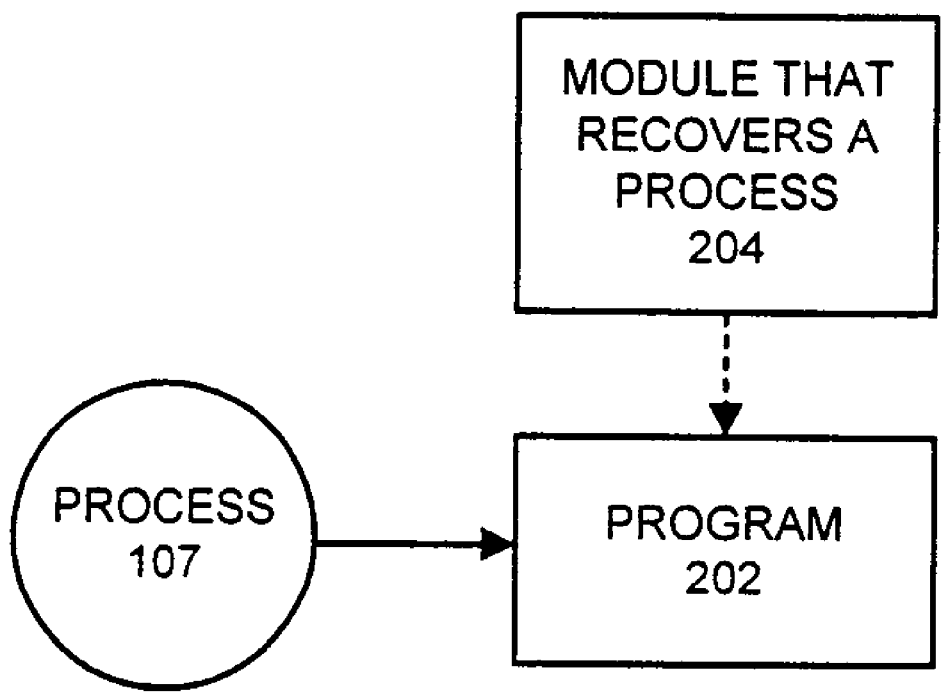
FIG. 2 illustrates how a module that performs the recovery is linked into a program in accordance with an embodiment of the present invention.

FIG. 2 illustrates how a code module 204 that performs the recovery operation is linked into a program 202 in accordance with an embodiment of the present invention. In this embodiment, the recovery operation is carried out by linking a dynamic library (module) 204 containing code that recovers the process into a program 202 that is being executed by the process. In this way, executing program 202 causes the recovery process to take place without requiring code to be added to kernel space 120 to coordinate the recovery process. Furthermore, note that the source code for program 202 is not required to perform this modification because module 204 can be linked into the executable code for program 202.

Recovery Operations

Figure 3:
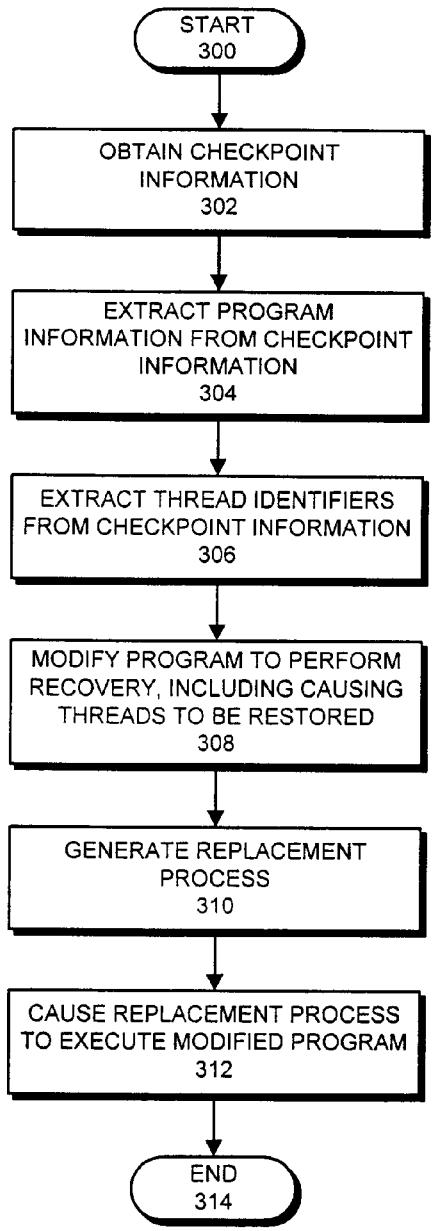
FIG. 3 is a flow chart illustrating the recovery of a multi-threaded process in accordance with an embodiment of the present invention.

FIG. 3 is a flow chart illustrating the recovery of a multi-threaded process in accordance with an embodiment of the present invention. The system first retrieves checkpoint information 110 from non-volatile storage device 108 (step 302). Next, the system extracts program information from checkpoint information 110 (step 304). This program information can include the name of a program that the process is executing, as well as any command line arguments for the program. The system also extracts identifiers for any threads (LWPs) that exist under the process (step 306).

Next, the system modifies the program being executed by the process to perform the recovery, including causing the threads to be restored (step 308). This may involve linking module 204 into the program. In one embodiment of the present invention, special code is injected into the recovery process by setting an environment variable to cause the dynamic linker to link specified shared libraries into all subsequently created processes. Another environment variable can be used to transmit the thread identifiers to the special code. The advantage of using environment variables is that they disappear after a subsequent address space overlay, and hence are not visible after the recovery operation.

Next, the system generates a replacement process (step 310) and then causes the replacement process to execute the modified program (step 312). Execution of the process can be stopped after executing the library initialization code module 204, but before main program execution, by performing an exec on the program under control of the /proc facility of the SOLARIS™ operating system. SOLARIS is a registered trademark of SUN Microsystems, Inc. By using the /proc facility, the program execution can be controlled as in a debugger to set a breakpoint at the main entry point of the recovery code.

Note that as an alternative to injecting a library, the system can run a different program that recreates the threads (LWPs) before overloading the program.

Figure 4:
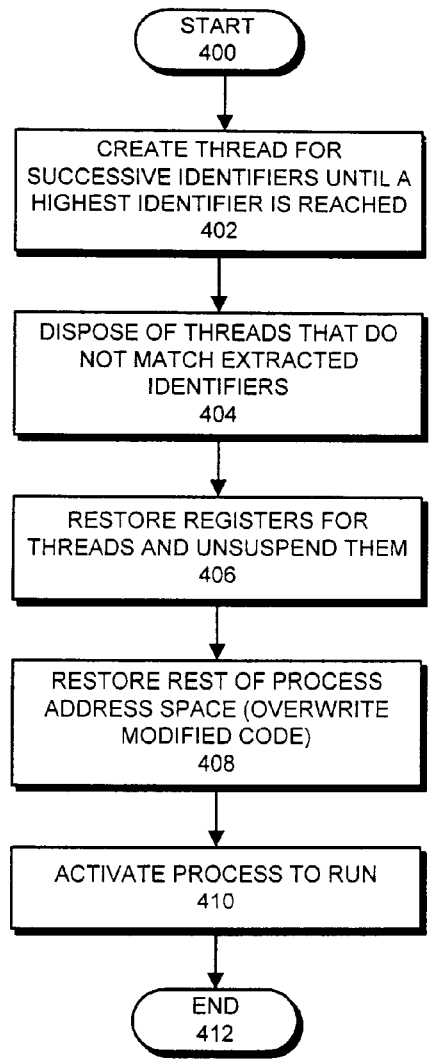
FIG. 4 is a flow chart illustrating the actions of the modified program during recovery of a multi-threaded process in accordance with an embodiment of the present invention.

FIG. 4 is a flow chart illustrating the actions of the modified program during recovery of a multi-threaded process in accordance with an embodiment of the present invention. The system first creates threads for all specified thread identifiers. This can be accomplished by creating threads for successive identifiers until a thread for a highest extracted identifier is reached (step 402). Next, the system disposes of threads that do not match any of the extracted identifiers (step 404). The above-described thread creation process can be used in operating systems for which creating a set of threads with non-contiguous identifiers is cumbersome. Furthermore, note that if threads cannot be explicitly disposed of through a system call, the system can simply cause newly created threads to execute a procedure that terminates quickly.

The system then restores registers for threads and individually unsuspends them (step 406). The system also restores the rest of the process's address space (step 408).

Note that this restoration process overwrites the environment variables and makes data and code associated with the recovery operation invisible to the process. The system finally activates the process, which causes all unsuspended threads to commence executing from the checkpoint. This completes the recovery operation.

Note that unlike conventional recovery operations that restore all processes running on computer system 102 at the same time, the above-described recovery operation can take place while other processes on computer system 102 continue executing.

Also note that the process of storing checkpoint information 110 is generally well-understood, and that there presently exist a number of utilities that store this information.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for recovering a process that is multi-threaded from checkpoint information that was previously stored for the process, comprising:
    obtaining the checkpoint information for the process;
    extracting an identifier for a program being run by the process as well as parameters of the program from the checkpoint information;
    extracting thread identifiers for threads associated with the process from the checkpoint information;
    modifying the program so that executing the program will cause the threads associated with the process to be restored;
    obtaining a replacement process to replace the process; and
    causing the replacement process to execute the modified program so that the threads are reconstituted within the replacement process.

2. The method of claim 1, wherein the modified program causes the threads associated with the process to be restored by:
    creating threads with identifiers matching the thread identifiers extracted from the checkpoint information;
    restoring registers for the threads from the checkpoint information;
    restoring an address space for the process from the checkpoint information; and
    activating the threads so that they commence execution.

3. The method of claim 2, wherein restoring the address space for the process involves overwriting the modified program with an unmodified version of the program, wherein the unmodified version of the program does not contain the modifications that cause the threads to be restored.

4. The method of claim 2, wherein creating the threads involves:
    creating threads for successive identifiers until a thread with a highest identifier in the extracted identifiers is created; and
    disposing of threads with identifiers that do not match the extracted identifiers.

5. The method of claim 1, wherein other processes continue executing while the process is being recovered.

6. The method of claim 1, wherein obtaining the checkpoint information for the process involves retrieving the checkpoint information from a file.

7. The method of claim 1, wherein the process is recovered by code that is executing in user space, outside of a kernel of an operating system, so that no modifications to the kernel are required to facilitate the recovery process.

8. The method of claim 1, wherein the modified program makes system calls to create the threads.

9. The method of claim 1, wherein modifying the program involves pre-loading and linking a dynamic library containing code that causes threads associated with the process to be restored.

10. A computer-readable storage medium storing instructions that when executed by a computer cause the computer to perform a method for recovering a process that is multi-threaded from checkpoint information that was previously stored for the process, the method comprising:
    obtaining the checkpoint information for the process;
    extracting an identifier for a program being run by the process as well as parameters of the program from the checkpoint information;
    extracting thread identifiers for threads associated with the process from the checkpoint information;
    modifying the program so that executing the program will cause the threads associated with the process to be restored;
    obtaining a replacement process to replace the process; and
    causing the replacement process to execute the modified program so that the threads are reconstituted within the replacement process.

11. The computer-readable storage medium of claim 10, wherein the modified program causes the threads associated with the process to be restored by:
    creating threads with identifiers matching the thread identifiers extracted from the checkpoint information;
    restoring registers for the threads from the checkpoint information;
    restoring an address space for the process from the checkpoint information; and
    activating the threads so that they commence execution.

12. The computer-readable storage medium of claim 11, wherein restoring the address space for the process involves overwriting the modified program with an unmodified version of the program, wherein the unmodified version of the program does not contain the modifications that cause the threads to be restored.

13. The computer-readable storage medium of claim 11, wherein creating the threads involves:
    creating threads for successive identifiers until a thread with a highest identifier in the extracted identifiers is created; and
    disposing of threads with identifiers that do not match the extracted identifiers.

14. The computer-readable storage medium of claim 10, wherein other processes continue executing while the process is being recovered.

15. The computer-readable storage medium of claim 10, wherein obtaining the checkpoint information for the process involves retrieving the checkpoint information from a file.

16. The computer-readable storage medium of claim 10, wherein the process is recovered by code that is executing in user space, outside of a kernel of an operating system, so that no modifications to the kernel are required to facilitate the recovery process.

17. The computer-readable storage medium of claim 10, wherein the modified program makes system calls to create the threads.

18. The computer-readable storage medium of claim 10, wherein modifying the program involves pre-loading and linking a dynamic library containing code that causes threads associated with the process to be restored.

19. An apparatus that recovers a process that is multi-threaded from a checkpoint information that was previously stored for the process, comprising:, comprising:

an extracting mechanism that is configured to extract an identifier for a program being run by the process as well as parameters of the program from the checkpoint information;

wherein the extracting mechanism is additionally configured to extract thread identifiers for threads associated with the process from the checkpoint information;

a program modifier that is configured to modify the program so that executing the program will cause the threads associated with the process to be restored;

a process generator that is configured to generate a replacement process to replace the process; and an execution mechanism that is configured to cause the replacement process to execute the modified program so that the threads are reconstituted within the replacement process.

20. The apparatus of claim 19, wherein the modified program is configured to cause the threads associated with the process to be restored by:

creating threads with identifiers matching the thread identifiers extracted from the checkpoint information;

restoring registers for the threads from the checkpoint information;

restoring an address space for the process from the checkpoint information; and activating the threads so that they commence execution.

21. The apparatus of claim 20, wherein the modified program is configured to restore the address space for the process by overwriting the modified program with an unmodified version of the program, wherein the unmodified version of the program does not contain the modifications that cause the threads to be restored.

22. The apparatus of claim 20, wherein the modified program is configured to create the threads by:

creating threads for successive identifiers until a thread with a highest identifier in the extracted identifiers is created; and disposing of threads with identifiers that do not match the extracted identifiers.

23. The apparatus of claim 19, wherein the apparatus is configured to allow other processes to continue executing while the process is being recovered.

24. The apparatus of claim 19, further comprising a retrieving mechanism that is configured to retrieve the checkpoint information from a file.

25. The apparatus of claim 19, wherein the apparatus includes code that is executing in user space, outside of a kernel of an operating system, so that no modifications to the kernel are required to facilitate the recovery process.

26. The apparatus of claim 19, wherein the modified program is configured to make system calls to create the threads.

27. The apparatus of claim 19, wherein the program modifier is configured to pre-load and link a dynamic library containing code that causes threads associated with the process to be restored.

* * * * *